E. STRAUSS & W. B. ERSKINE.
COMPOSITE FABRIC.
APPLICATION FILED JULY 21, 1909.
952,849.
Patented Mar. 22, 1910.
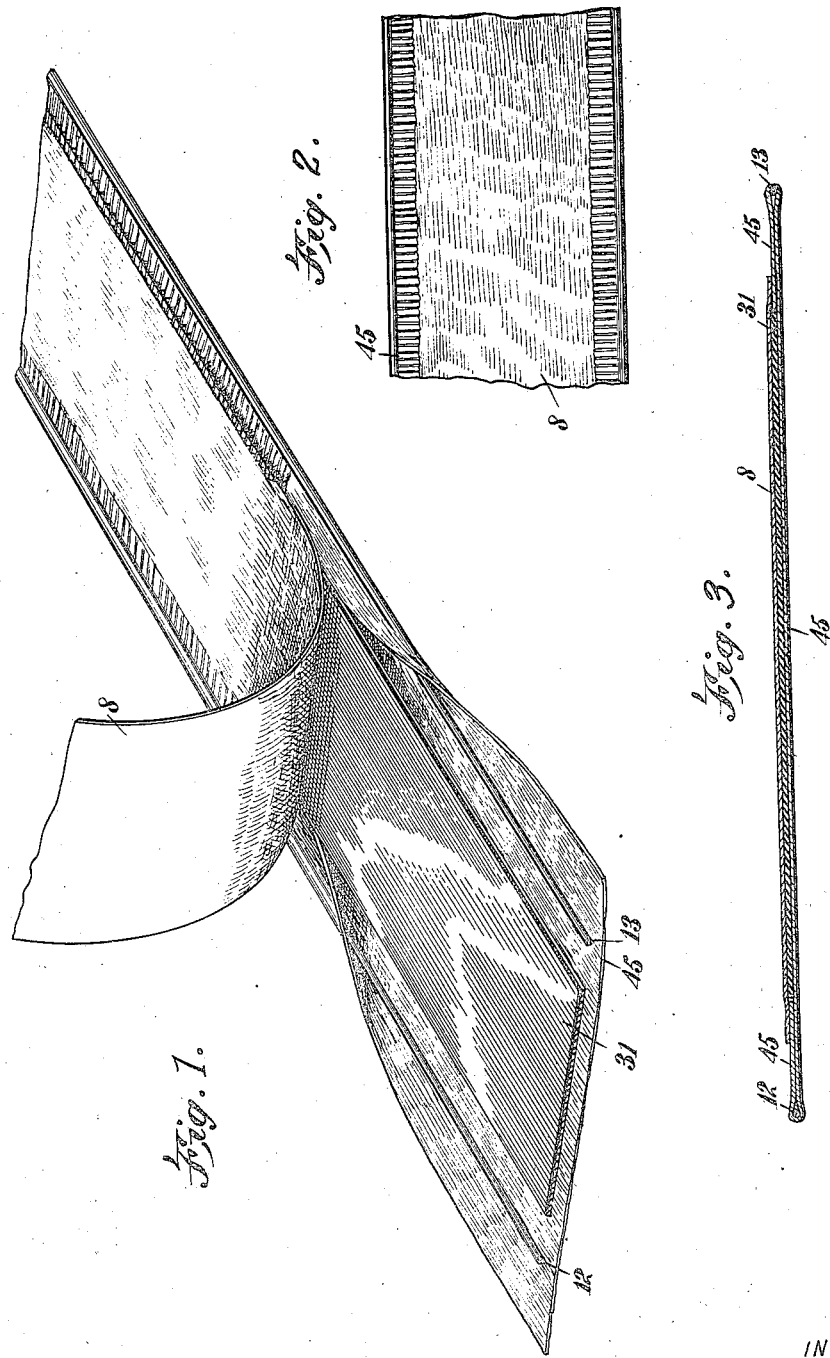
WITNESSES
INVENTORS
Ernest Strauss
William B. Erskine
BY
ATTORNEYS

UNITED STATES PATENT OFFICE.

ERNEST STRAUSS AND WILLIAM B. ERSKINE, OF NEW YORK, N. Y.

COMPOSITE FABRIC.

952,849.

Specification of Letters Patent. Patented Mar. 22, 1910.

Application filed July 21, 1909. Serial No. 508,833.

*To all whom it may concern:*

Be it known that we, ERNEST STRAUSS and WILLIAM B. ERSKINE, both citizens of the United States, and residents of the city of New York, borough of Manhattan, in the county and State of New York, have invented a new and Improved Composite Fabric, of which the following is a full, clear, and exact description.

This invention relates to a new and improved composite fabric of the elastic type.

An object of the invention is to provide a fabric which will be simple in construction, strong, durable and inexpensive to manufacture.

A further object of the invention is to provide a composite fabric of high elasticity, which will stretch readily without tearing the non-elastic components thereof.

These and further objects, together with the construction and combination of parts, will be more fully described hereinafter and particularly set forth in the claim.

Reference is to be had to the accompanying drawings forming a part of this specification, in which similar characters of reference indicate corresponding parts in all the views, and in which—

Figure 1 is a perspective view of the composite fabric partially completed; Fig. 2 is a top plan view of a strip of the composite fabric, and Fig. 3 is a vertical transverse section showing the relative position of the component parts of the composite fabric.

Referring more particularly to the separate parts, 45 represents one layer or component part of the composite fabric, which may be of any suitable fabric, such as cotton or silk, preferably the latter. The layer 45 is turned over at its side edges, to form folds, within the outer edges of which there are provided elastic threads 12 and 13, which are made of any suitable material, such as rubber, gutta-percha or the like.

Intermediate the threads 12 and 13, and spaced apart therefrom, there is provided an elastic layer or band 31, which lies adjacent the fabric layer 45, and is made of any suitable material, such as rubber, gutta-percha or the like. Covering the elastic layer 31 there is provided a fabric layer 8, which may be made of any suitable material, such as cotton, silk or the like, and is of such a width as to slightly overlie the folded-over edges of the fabric layer 45. The elastic members 12, 13 and 31 are secured to the fabric layers 8 and 45 by means of a suitable adhesive material, such as cement or the like, with which they are coated on all sides, and with which the fabric layers are coated on their facing surfaces. The fabric layer 45 is also coated with this adhesive material along the folded-over side edges which contact with the under surface of the fabric layer 8.

By reason of the method used in forming this composite fabric, the fabric layers 8 and 45 are formed with a series of wrinkles or corrugations adjacent the side edges of the composite fabric between the side edges of the elastic layer 31 and the elastic threads 12 and 13. Intermediate the corrugations just mentioned, the fabric layers 8 and 45 are formed with a multitude of miniature or microscopic transverse wrinkles or corrugations. These corrugations permit the composite fabric to stretch without tearing the fabric layers.

In making the composite fabric, the fabric layer 45 is coated on one side with a suitable adhesive material, such as cement, mucilage or the like, and allowed to dry, either artificially or naturally. The side edges of the opposite side of the fabric layer 45 are then coated with the same adhesive material, and also allowed to dry. The fabric layer 8 is also coated on one side with a suitable adhesive material, and dried. The elastic layer 31 is preferably coated on both sides with the adhesive material, and dried, and the elastic threads 12 and 13 are also coated, preferably on all sides, with a suitable adhesive material, and dried. The coating of the component parts with the adhesive material may be done in any suitable manner, such as by running the component parts in contact with a plastic mass of adhesive material. The component parts are then placed on reels, which supply the material to a machine which is particularly described and claimed in our co-pending application, Serial No. 508,834, filed July 21, 1909, and which assembles the component parts in their proper relation, and places the elastic members under a distorting or extenuating tension, and subjects the assembled parts to a pressure, whereby they are adhered together by reason of their adhesive coatings.

There is thus provided a composite fabric of the elastic type, which will be exceedingly strong, and which will stretch to a considerable extent without injuring the textile members of the composite fabric.

Having thus described our invention, we claim as new and desire to secure by Letters Patent:—

A composite fabric, consisting of a strip of fabric material, a strip of elastic material thereon and of lesser width than the first strip, and elastic strings spaced apart from the edges of the elastic strip and substantially parallel with the said edges, the edges of the first named strip being folded over on the strings, a strip of fabric material on the said elastic strip, said strip being of greater width than the elastic strip and of lesser width than the first named strip and secured to the turned over edges thereof.

In testimony whereof we have signed our names to this specification in the presence of two subscribing witnesses.

ERNEST STRAUSS.
WILLIAM B. ERSKINE.

Witnesses:
 HORATIO WHITING,
 PHILIP D. ROLLHAUS.